United States Patent [19]
Tomita et al.

[11] Patent Number: 5,619,220
[45] Date of Patent: Apr. 8, 1997

[54] SOUND IMAGE DISPLAY METHOD AND APPARATUS

[75] Inventors: Hiroyuki Tomita; Tōru Furuse; Masakatu Mizukami; Akihiro Masukawa, all of Kanagawa-ken, Japan

[73] Assignee: Leader Electronics Corporation, Kanagawa-ken, Japan

[21] Appl. No.: 320,392

[22] Filed: Oct. 11, 1994

[30] Foreign Application Priority Data

Oct. 8, 1993 [JP] Japan .................................. 5-252977

[51] Int. Cl.$^6$ ............................................. G09G 1/08
[52] U.S. Cl. ..................................... 345/14; 345/15
[58] Field of Search ........................ 345/14, 15; 381/1, 381/56

[56] References Cited

U.S. PATENT DOCUMENTS

| | | |
|---|---|---|
| 3,320,409 | 5/1967 | Larrowe . |
| 3,643,251 | 2/1972 | Kolb et al. ................................. 345/14 |
| 3,649,819 | 3/1972 | Waller ........................................ 345/14 |
| 4,176,375 | 11/1979 | Scarpelli .................................... 381/56 |
| 5,272,756 | 12/1993 | Tanaka et al. ............................ 381/1 X |
| 5,410,245 | 4/1995 | Ikuzawa et al. ......................... 345/14 X |

OTHER PUBLICATIONS

"Development of Sound Audio Monitor", Toshiya Kikkawa, Setsu Komiyama and Toru Kamekawa, Aug. 1, 1993, Hohsoh–Gijutsu, vol. 46, No. 8, pp. 77–81.

"Sound Mixing in Audio Visual Age", Kenrokukan Publishing Co., Ltd., Nov. 15, 1989, pp. 38–43.

Service Manual of VM700A by Textronix, printed Jul. 1991, revised Jul. 1992, pp. 2–1 to 2–5, and Preliminary Operator's Manual of VM700A Option 40 by Textronix, printed 09/90, revised 01/91, pp. 3–9 and 15–17.

Instruction Manual of 760 Stereo Audio Monitor manufactured by Tektronix, printed Jul. 1986, revised Dec. 1988, pp. 2–1 to 2–7 and 6–1 to 6–8.

*Primary Examiner*—Ulysses Weldon
*Attorney, Agent, or Firm*—Fish & Richardson PC

[57] ABSTRACT

A sound image display apparatus displays a sound image waveform representing a sound image produced by a multichannel surround audio signal in a readily visible form. The sound image display apparatus includes a scaling section which has a variable gain calculator. The calculator determines the variable gain commonly applied to the X-axis and Y-axis components for displaying a sound image on a limited space of the screen of a display.

8 Claims, 7 Drawing Sheets

SOUND IMAGE DISPLAY METHOD AND APPARATUS

BACKGROUND OF THE INVENTION

1. Field of the Invention

The present invention relates to sound image display techniques for visually displaying a sound image formed by a multi-channel audio signal in a reproduced sound field, and more particularly to a sound image display method and apparatus which is particularly suitable for monitoring localization, spacial impression and phase of a sound image in the production of audio products utilizing surround techniques.

2. Background of the Invention

A prior art sound image display technique is described in an article entitled "Development of Surround Audio Monitor" in a magazine called "Hoso-gijutsu (Broadcasting Techniques)" (1993, vol. 46, No. 8, pp. 77–81). A surround audio monitor proposed in the article is adapted to monitor the localization, spacial impression and phase of a sound image formed by a surround audio signal such as a Dolby surround audio signal as well as 3-1 configuration four-channel stereo and 3-2 configuration five-channel stereo signals by displaying the sound image on an X-Y scope. A commercially available video analyzer (Type VM700A) manufactured by Sony Tektronix Co. functions to display a Lissajous waveform of a two-channel stereo audio signal on the screen of an X-Y scope. The video analyzer is provided with an automatic gain control (AGC) function for performing the automatic gain control on X-axis and Y-axis components inputted to the X-Y scope on the basis of the higher level one of the X-axis and Y-axis components when a Lissajous waveform is displayed.

The above-mentioned surround audio monitor displays sound images based on four-channel/five-channel surround audio signals in an X-Y coordinate system. For this purpose, X-axis and Y-axis components of a sound image are calculated as products of sound pressure P and particle velocities ($U_x$, $U_y$). It will therefore be understood that the calculations of the X-axis and Y-axis components of a sound image present an input/output relationship of a square characteristic. Specifically, if an input is decreased to one half of a previous value, an output will be decreased to one quarter. Conversely, an input increased by a factor of two will result in an output which is increased by a factor of four. Since the sound image is displayed on a limited display space of an X-Y scope, if an input signal is small, the observer will have difficulty in tracing its sound image trajectory displayed on the X-Y scope (the trajectory will hereinafter be simply called the sound image waveform). On the other hand, if an input signal is large, the sound image waveform is scaled out, so that the entire waveform can not readily be recognized by the observer.

Also, with the above-mentioned method of displaying a Lissajous waveform on a video analyzer, the monitoring of the localization and spacial impression of a sound image for a surround audio signal is difficult.

SUMMARY OF THE INVENTION

Accordingly, an object of the present invention is to provide a sound image display method and apparatus which is capable of displaying a sound image waveform representing a sound image formed by a multi-channel surround audio signal in a readily visible form.

Another object of the present invention is to provide a sound image display apparatus and method for multi-channel surround audio signals, which has an AGC function.

To achieve the above objects, according to one aspect of the present invention, there is provided a sound image display method for visually displaying a sound image formed by a multi-channel audio signal in a reproduced sound field on a two-dimensional plane, said two-dimensional plane having a first axis and a second axis orthogonal to each other, said method comprising the steps of: (a) generating a first signal representing a first axis component and a second signal representing a second axis component from said multi-channel audio signal for displaying a sound image; (b) scaling the first and second signals by generating third and fourth signals, said third signal being generated by multiplying said first signal by a variable gain, the fourth signal being generated by multiplying said second signal by said variable gain, said variable gain being determined from a length of a vector and a reference value of the vector length, said vector having said first and second signals or said third and fourth signals as said first and second axis components, respectively; and (c) displaying a two-dimensional representation having said third and fourth signals as said first and second axis components, respectively.

According to the present invention, said step (b) includes the steps of decreasing said variable gain when said vector length is larger than said reference value; and increasing said variable gain when said vector length is not larger than said reference value. Also, the step (b) may employ a first ratio when said variable gain is decreased, and employ a difference between said reference value and said vector length and a second ratio when said variable gain is increased. Further, the step (b) may varies the variable gain between a lower limit value and an upper limit value.

According to another aspect of the present invention, there is provided a sound image display apparatus for visually displaying a sound image formed by a multi-channel audio signal in a reproduced sound field, comprising: display means including a screen having a first axis and a second axis orthogonal to each other, a first axis input and a second axis input; sound image axis component generating means coupled to receive said multi-channel audio signal for generating a first signal representing a first axis component and a second signal representing a second axis component for displaying a sound image; and scaling means for generating a third signal by multiplying said first signal by a variable gain and for generating a fourth signal by multiplying said second signal by said variable gain, said third and fourth signals being applied to said first and second axis inputs of said display means, respectively, said scaling means including variable gain calculating means for determining said variable gain by a length of a vector and a reference value of the vector length, said vector having said first and second signals or said third and fourth signals as said first and second axis components, respectively.

According to the present invention, the variable gain calculating means may include: vector length calculating means coupled to receive said third and fourth signals for calculating a length of a vector having said third and fourth signals as said first and second axis components, respectively; comparator means coupled to receive said vector length and said reference value for generating a fifth signal when said vector length is larger than said reference value and generating a sixth signal when said vector length is not larger than said reference value; and variable gain adjusting means for decreasing said variable gain when said comparator means generates said fifth signal and increasing said variable gain when said comparator means generates said sixth signal. Also, the gain adjusting means may employ a first ratio when the variable gain is decreased, and a difference between the reference value and the vector length and a second ratio when the variable gain is increased. Further, the variable gain calculating means may include limiting means for limiting the variable gain adjusted by the variable gain adjusting means to a predetermined lower limit value when the adjusted variable gain is lower than the lower limit value, and limiting the adjusted variable gain to a predetermined upper limit value when the adjusted variable gain is larger than the upper limit value.

BRIEF DESCRIPTION OF THE DRAWINGS

The present invention will hereinafter be described in connection with the preferred embodiment thereof with reference to the accompanying drawings:

FIG. 6 is a graph showing the relationship between an input voltage (an input voltage to DSP 20) and an output voltage (an output voltage of a D/A and LPF circuit 22) of an audio monitor, where a dashed line shows the input/output relationship when the AGC function is off, and a solid line shows the input/output relationship when the AGC function is on;

DESCRIPTION OF THE PREFERRED EMBODIMENT

Figure 1:
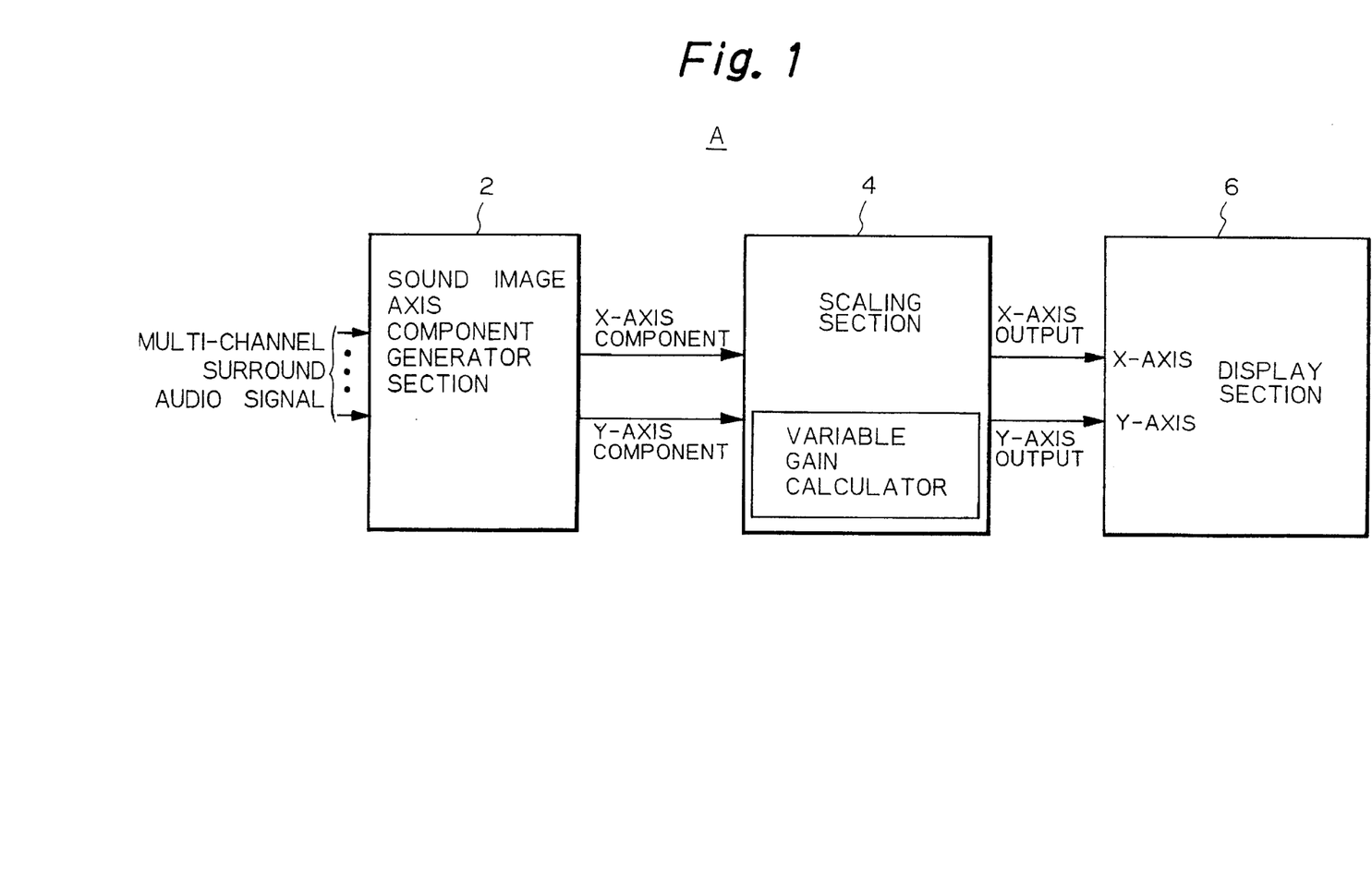
FIG. 1 is a block diagram showing the basic configuration of a sound image display apparatus according to the present invention.

FIG. 1 is a block diagram showing the basic configuration of a sound image display apparatus according to the present invention. The sound image display apparatus A includes a sound image axis component generator section 2 which receives a multi-channel surround audio signal at the input thereof; a scaling section 4 having a variable gain calculator; and a display section 6 having X-axis and Y-axis inputs for displaying a sound image within a limited X-Y two-dimensional display region which has an X-axis and an Y-axis orthogonal to each other. Explaining in greater detail, the sound image axis component generator 2 utilizes known equations, for example, the equations described in the article in the aforementioned magazine "Hoso-gijutsu" to calculate X-axis and Y-axis component signals of a sound image, in order to generate a sound image waveform from the received surround audio signal. The sound image represented by the sound image waveform approximates to an actual sound image formed in a reproduced sound field by the surround audio signal supplied to the generator 2. The scaling section 4 at the next stage, which receives the X-axis and Y-axis component signals, performs a common scaling to the received signals by the use of a variable gain calculated by the variable gain calculator so as to display a sound image waveform within a limited X-Y two-dimensional display region of the display section 6, in such a form that facilitates the user to observe the displayed waveform. The resultant scaled X-axis and Y-axis component signals are outputted from the scaling section 4. The display section 6, which receives the respective output signals from the scaling section 4, displays a sound image waveform within the two-dimensional display region based on the received output signals.

The form of display that facilitates observation of a sound image by a user, for example, a mixing engineer in a broadcasting studio, may be defined as when an inputted audio signal exists within a particular input level range of interest (for example, in a range from −20 dB to +8 dB), a sound image formed by the inputted audio signal is displayed within a display region and has a sufficiently visible size. Therefore, for input audio signals out of the input level range of interest, even if displayed sound image waveforms are too large and overflow out of the display region, or even if they are too small for a user to view on the screen, the influence is not so grave. If a plurality of sound images having the same signal magnitude are located at different positions, the displaying of the sound images in the same length is advantageous to the mixing.

The variable gain calculation performed in the scaling section 4 may adjust a variable gain by using a feedback manner (adjusting the variable gain using the outputs of the scaling section, i.e., the X-axis and Y-axis outputs) or a feed forward manner (adjusting the variable gain using the inputs to the scaling section, i.e., the X-axis and Y-axis components).

Figure 2:
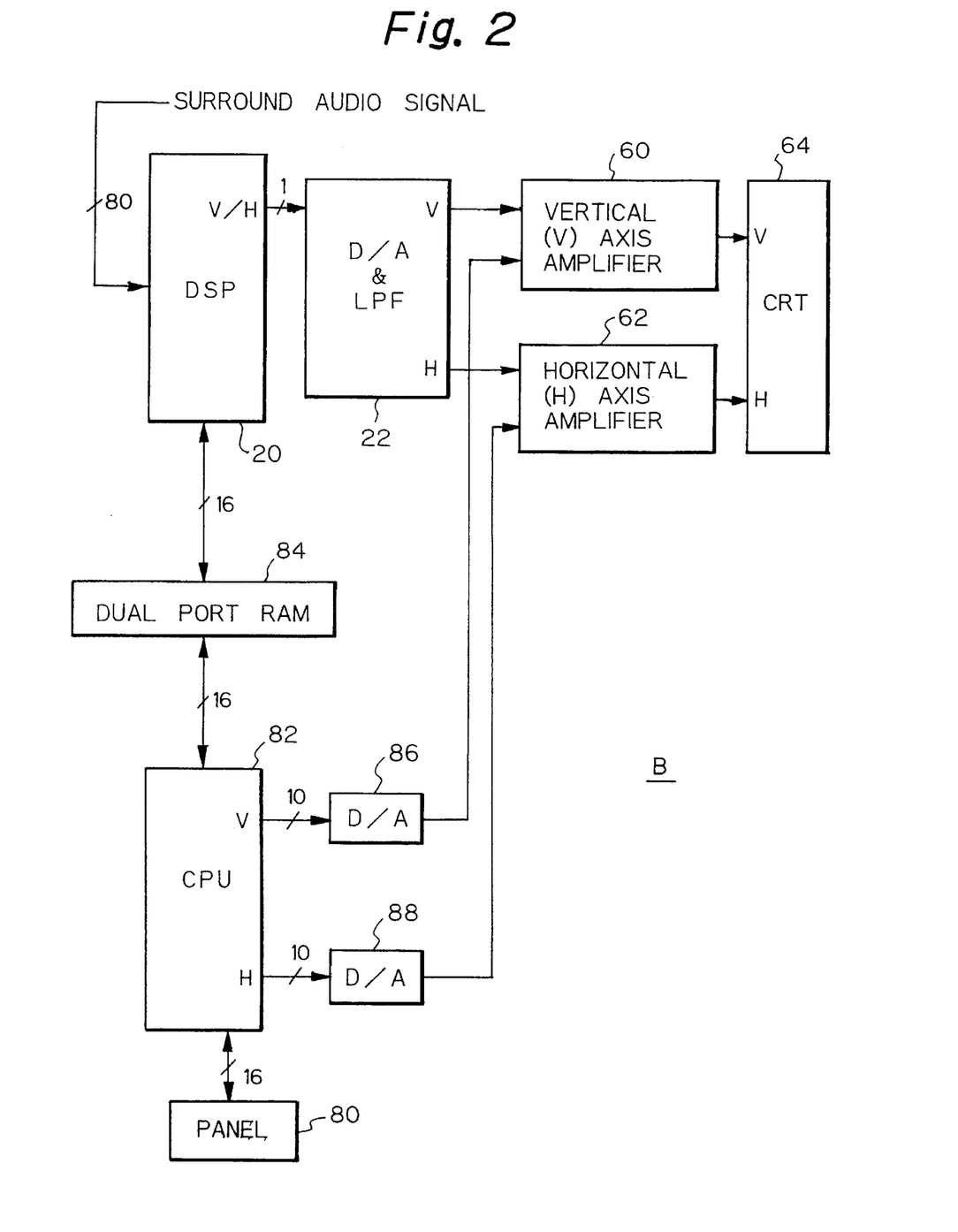
FIG. 2 is a block diagram showing an audio monitor scope which embodies the sound image display apparatus of FIG. 1.

Next, FIG. 2 shows an audio monitor scope B which embodies the basic configuration of the sound image display apparatus shown in FIG. 1. The monitor scope B includes a digital signal processor (DSP) 20 which receives a surround audio signal in a digital form. In the present embodiment, the operation of the monitor scope B will be explained with a 3-2 configuration five-channel stereo signal given as an example of a surround audio signal. The high-vision five-channel stereo signal consists of an L-ch signal, R-ch signal, C (center)-ch signal, SL (surround left)-ch signal, and SR (surround right)-ch signal, and each channel signal is represented by a 16-bit word. In the present embodiment, the five channel signals are sampled at a frequency of 48 KHz and parallelly inputted to the DSP 20.

The DSP 20 performs sound image calculations from the inputted stereo signal and generates a sound image vertical (V) axis output signal and a sound image horizontal (H) axis output signal which are alternately delivered to be generated at an output terminal V/H in series. A digital-to-analog (D/A) convertor and low pass filter (LPF) circuit 22, having an input connected to the output terminal V/H of the DSP 20, converts received digital V-axis and H-axis output signals to an analog form, smooths the analog V-axis and H-axis output signals and delivers the resultant V-axis sound image analog output signal to a V-output terminal and the H-axis sound image analog output signal to an H-output terminal. A vertical axis amplifier 60 and a horizontal axis amplifier 61, respectively having an input connected to the V-output terminal or the H-output terminal of the circuit amplify respective sound image analog output signals, and deliver the amplified signals to their respective outputs. A CRT 64 has a V-axis input connected to the output of the V-axis amplifier 60 and an H-axis input connected to the output of the H-axis amplifier 62.

The monitor scope B further includes a control panel 80 and a central processing unit (CPU) 82 which is connected to the panel 80 so as to receive a variety of control signals from the panel 80 and send signals to the panel 80. Although not shown in FIG. 2, the monitor scope B is provided with inputs for receiving a balanced analog signal, an unbalanced analog signal, or a digital signal in AES/EBU format as a surround audio signal, and can receive at each of the inputs four-channel (L, R, C, S) signals as well as five-channel (L, R, C, SL, SR) signals. The selection of the input signals, i.e., the selection from balanced/unbalanced analog inputs and the selection from analog/digital signals, may be made from the control panel 80. It should be noted that an analog input signal is converted to a digital signal by an A/D convertor (not shown), while a digital input signal is converted to another digital signal by a digital interface receiver (not shown). The CPU 82, which receives a signal representative of the selections, sends signals necessary for the selections to associated circuits, not shown, and also sends a variety of signals including a signal indicative of a selected input (due to different sound image calculating equations for four-channel and five-channel signals), a signal representative of ON/OFF of the AGC (automatic gain control) function, later described, and so on to the DSP 20 through a dual port RAM 84.

The CPU 82 also generates a V-axis component digital signal and an H-axis component digital signal at a terminal designated V and a terminal designated H, respectively, for displaying characters and/or a scale on the CRT 64. The V-output terminal is connected to the input of D/A convertor 86 while the H-output terminal is connected to the input of D/A convertor 88. D/A convertors 86 and 88 convert received inputs into analog forms, and delivers resultant analog signals to their outputs. The outputs of the D/A convertors 86 and 88 are connected to the respective second inputs of the amplifiers 60 and 62. Each of the amplifiers 60 and 62 alternately outputs the sound image output signal received at the first input and the output signal of the associated D/A convertor 86 or 88 received at the second input to the CRT 64, thus allowing the observer to simultaneously view a sound image waveform and the characters and/or scale on the CRT 64.

Figure 3:
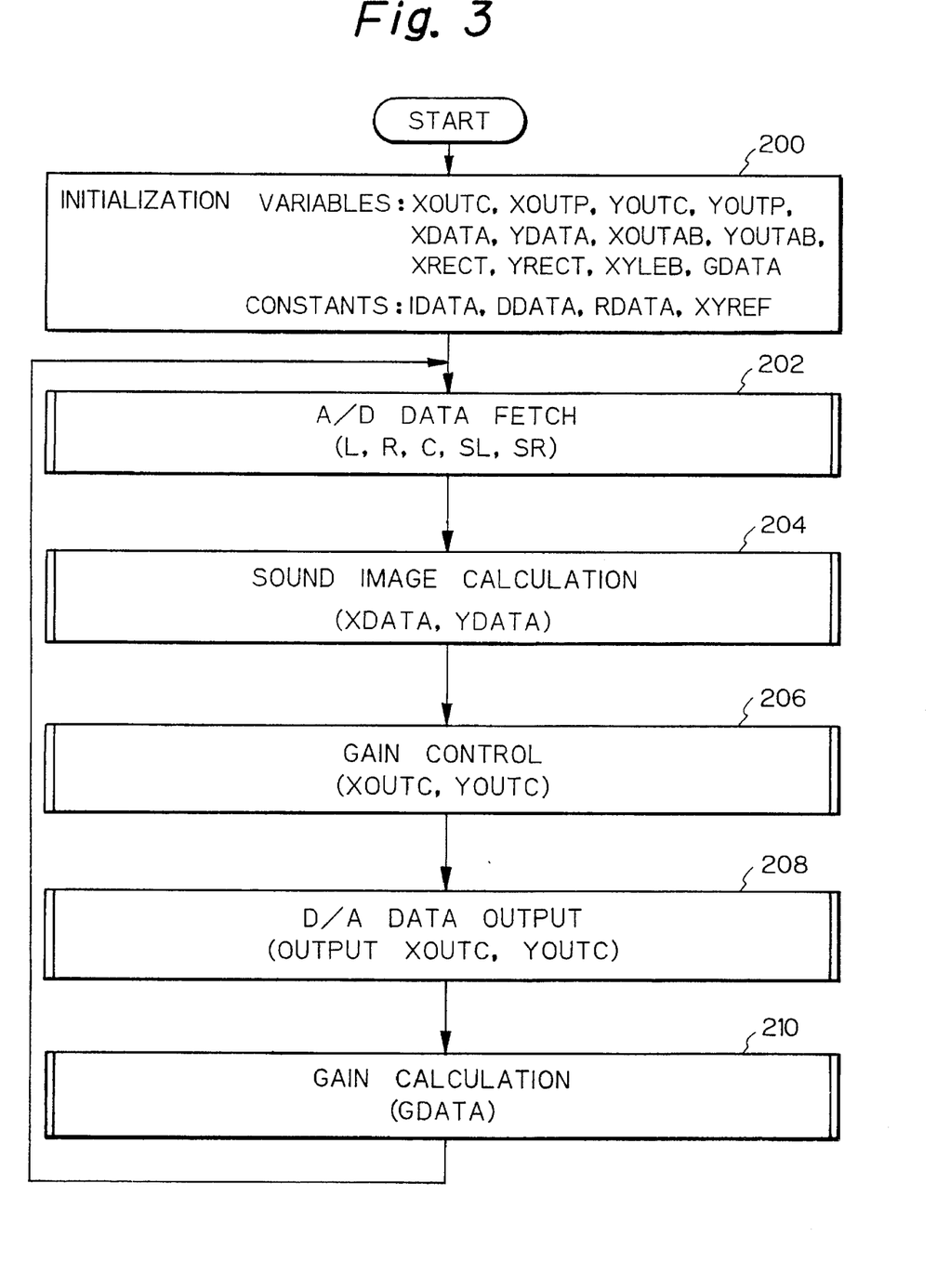
FIG. 3 is a flow chart showing a flow of sound image calculations executed by a digital signal processor (DSP) 20 in FIG. 2.

FIG. 3 shows a flow of sound image calculations executed by the DSP 20. It should be noted that the flow is executed when the AGC function is on. First, at step 200, a variety of variables are initialized, and constants are set. More specifically, a current value XOUTC and a previous value XOUTP of a sound image X-axis output value XOUT, a current value YOUTC and a previous value YOUTP of a sound image Y-axis output value YOUT, a sound image X-axis component value XDATA and a sound image Y-axis component value YDATA, an absolute value XOUTAB and a full wave rectification value XRECT of the current value XOUTC, an absolute value YOUTAB and a full wave rectification value YRECT of the current value YOUTC, a sound image vector length XYLEB, and a Gain GDATA are respectively initialized to zero. Further, a gain increase ratio IDATA is set to 0.0001, a gain decrease ratio DDATA to 0.9995, a full wave rectification ratio RDATA to 0.9999, and a vector length reference value XYREF to a value corresponding to −3 dB (preferably, a value corresponding to a full scale position in the vertical or horizontal direction on a screen 640 of the CRT 64 shown in FIG. 5).

Next, at step 202, a digital audio signal input is fetched or acquired. In this example, a 3-2 configuration five-channel audio signal is fetched. At next step 204, sound image axis components, that is, the sound image X-axis component value XDATA and the sound image Y-axis component value YDATA are calculated by the following equations (1):

$$XDATA=0.7\times(L+R+C+SL+SR)\times(R+SR-L-SL)\ YDATA=(L+R+C+SL+SR)\times\{C+0.7\times(L+R-SL-SR)\} \quad (1)$$

At subsequent step 206, the AGC function is executed. At this step, the sound image axis component values XDATA and YDATA are scaled using a previous gain GDATA by the following equations (2) to calculate the sound image X-axis and Y-axis output values XOUTC and YOUTC:

$$XOUTC=XDATA\times GDATA\ YOUTC=YDATA\times GDATA \quad (2)$$

At next step 208, XOUTC and YOUTC, calculated at step 206 are orderly outputted to the D/A and LPF circuit 22 such that a sound image is displayed on the CRT 64 in a X-Y two-dimensional form by the sound image X-axis and Y-axis output values XOUTC and YOUTC supplied to the CRT 64 through the circuit 22 and the amplifiers 60 and 62.

At last step, that is, gain calculation step 210, the gain for use in the next execution of the AGC function is calculated from the current sound image axis output values. Upon completing the calculation at step 210, the flow jumps to step 202 to repetitively execute the same sequence of steps described above. The repeating frequency in this case is identical to the sampling frequency of the digital audio signal inputted to the DSP 20.

Figure 4:
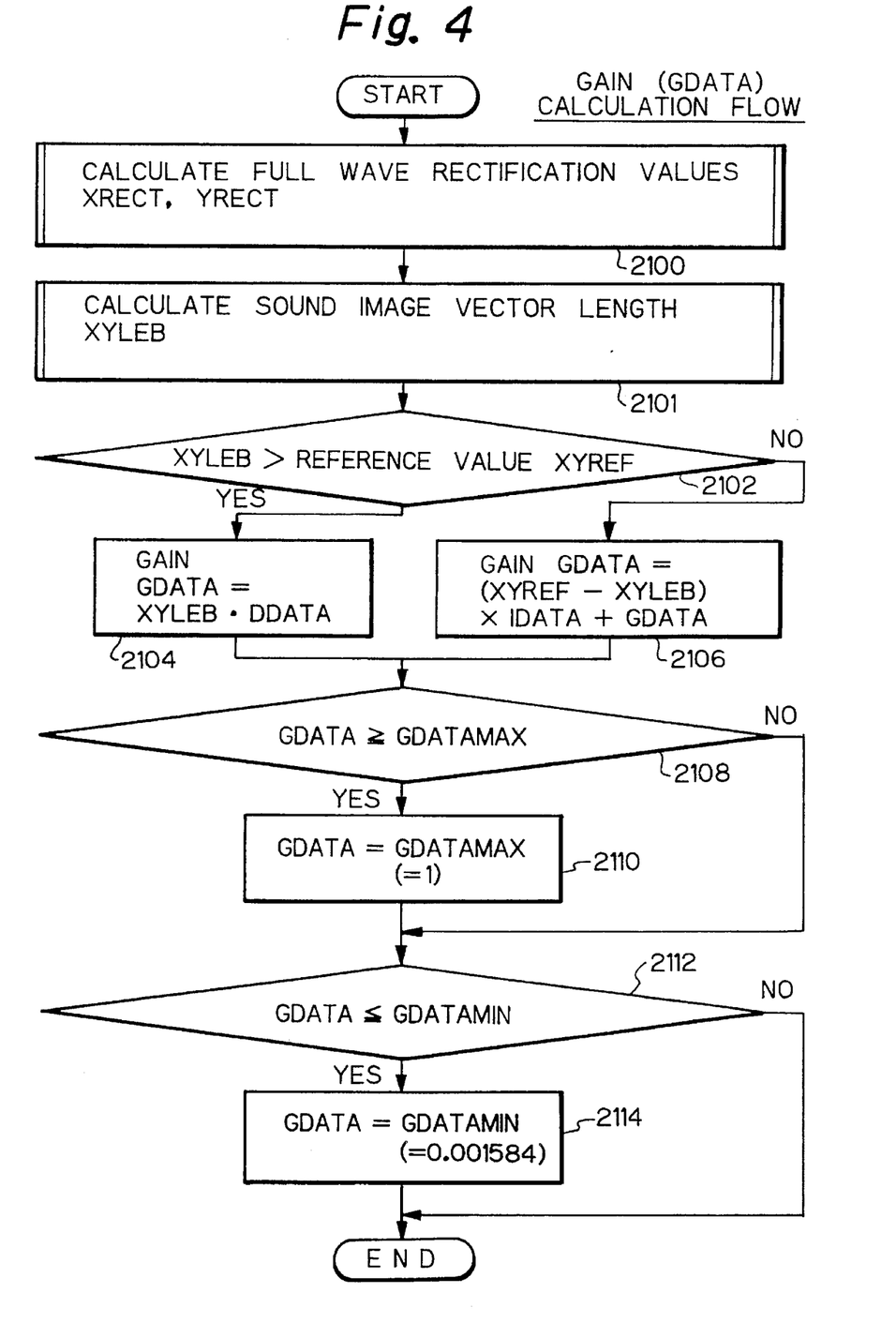
FIG. 4 is a flow chart showing in detail a flow of gain calculations executed at step 210 in FIG. 3.

FIG. 4 shows a detailed flow of the gain calculation step 210 of FIG. 3. Referring to FIG. 4, the gain calculation step will be explained in greater detail. First, at step 2100, the X-axis full wave rectification value XRECT which is a full wave rectification value of XOUTC, and the Y-axis full wave rectification value YRECT which is a full wave rectification value of YOUTC are calculated. The calculations of the full wave rectification values at step 2100 will be described later with reference to FIGS. 7 and 8A–8C. Next, at step 2101, the sound image vector length XYLEB is calculated by the following equation (3) from the rectification values XRECT and YRECT derived at previous step 2100:

$$XYLEB=ROOT\{(XRECT^2+YRECT^2)\} \quad (3)$$

Figure 5:
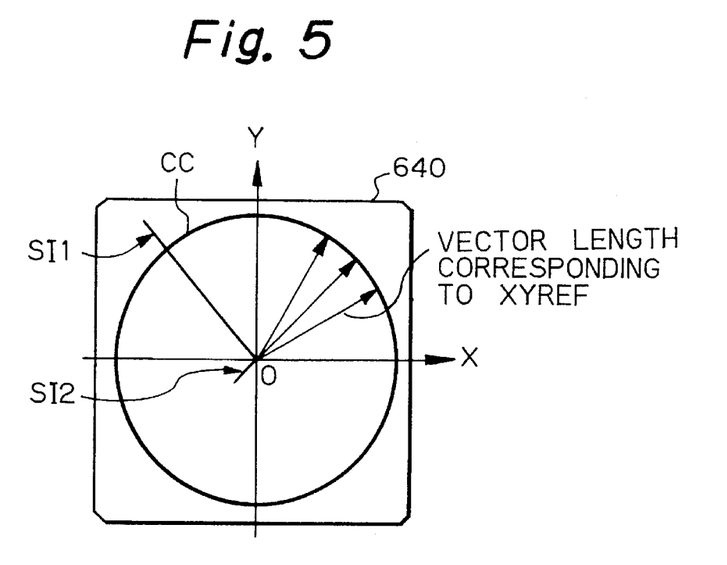
FIG. 5 is a diagram showing images on a screen of a cathode ray tube (CRT) in FIG. 2.

Next, at step 2102, the vector length just calculated is compared with the vector length reference value XYREF (see FIG. 5). If the calculated value is larger than the reference value (XYLEB>XYREF), indicating that a displayed sound image waveform extends out of a reference circle CC on the screen (the circle CC having a radius equal to the reference value XYREF with the center thereof positioned at the origin 0) shown in FIG. 5, the flow proceeds to step 2104, where a gain GDATA to be used at the next time is calculated by the following equation (4) from the vector length XYLEB and the gain decrease ratio DDATA:

$$GDATA=XYLEB\times DDATA \quad (4)$$

Since the gain decrease ratio DDATA (=0.9995) extremely close to one is used in the calculation, the gain GDATA is decreased by a slight amount each time the step 2104 is passed when the step continues to be passed. In this event, since the flow repeats step 2104 at a frequency of 48 KHz, if the DSP 20 continuously receives an audio input having a certain level within a level range of interest between −20 dB and +8 dB and larger than −3 dB corresponding to the vector length reference value XYREF (for example, an input which forms a sound image waveform SI1 in FIG. 5), step 2104 serves to converge the tip of the sound image waveform SI1 to a position on the reference circle CC at least in approximately 0.5 seconds. The time for converging the sound image waveform is selected to approximately 0.5 seconds, first because the AGC function does not operate upon a low frequency audio input at approximately 20 Hz if the sound image waveform is converged in a shorter time than approximately 0.5 seconds, and secondly because convergence slower than approximately 0.5 seconds will cause a delay in changing the gain in response to the varying magnitude of sound, with the result that a sound image waveform would appear too large or too small on the screen as is the case in not using the AGC function. Stated another way, if the converging time is longer than approximately 0.5 seconds, a displayed sound image waveform is not corrected in accordance with changes in the magnitude of sound. It should be noted that with an audio input having a level higher than +8 dB, the tip of a sound image waveform produced by the audio input is not converged to a position on the reference circle CC.

On the other hand, if the vector length XYLEB calculated at step 2101 is equal to or smaller than the reference value XYREF (XYLEB≦XYREF), the flow proceeds to step 2106, where a gain GDATA to be used at the next time is calculated by the following equation (5) from the difference between the reference value XYREF and the calculated vector length XYLEB, the current gain, and the gain increase ratio IDATA (=0.0001):

$$GDATA=(XYREF-XYLEB) \times IDATA+GDATA \quad (5)$$

Similarly, since the gain increase ratio IDATA is extremely small, the gain GDATA is increased by a slight amount each time the step 2106 is passed when the step continues to be passed. Also in this event, since the flow repeats step 2106 at a frequency of 48 KHz, if the DSP 20 continuously receives an audio input having a certain level within the level range of interest between −20 dB and +8 dB and lower than −3 dB (for example, an input which forms a sound image waveform SI2 in FIG. 5), step 2106 serves to extend the tip of the sound image waveform SI2 to a position on the reference circle CC at least in approximately one second. It should be noted that with an audio input having a level lower than −20 dB, the tip of a sound image waveform produced by the audio input is not extended to a position on the reference circle CC. The reason for selecting the converging time to be one second at step 2106 is substantially the same as the reason for selecting the converging time to be 0.5 seconds at step 2104. It should be noted however that the converging time at step 2106 is longer than that at step 2104 because it is designed that a scaled-out sound image waveform be accommodated within the display area sooner.

After executing step 2104 or 2106, the flow proceeds to steps 2108–2114 for limiting the gain GDATA calculated at step 2104 or 2106 by providing upper and lower limit values. This is because the AGC function is suppressed with respect to audio inputs out of the input level range of interest in order for the observer to more readily recognize displayed sound image waveforms corresponding to inputs within the input level range of interest. Explaining in greater detail, it is determined at step 2108 whether or not the calculated gain GDATA is equal to or more than an upper limit value GDATAMAX (=1). GDATA=1 is a value produced when an audio input at approximately −20 dB is received. If GDATA≧1, GDATA is set to be equal to one at step 2110, and then the flow proceeds to step 2112. If GDATA<1, the flow directly proceeds to step 2112 without any limitation of the gain GDATA. At step 2112, it is determined whether or not GDATA is equal to or less than a lower limit value GDATAMIN (=0.001584). GDATA=0.001584 is a value produced when an audio input at approximately +8 dB is received. If GDATA is equal to or less than GDATAMIN, GDATA is set to be equal to GDATAMIN. On the other hand, if GDATA is larger than GDATAMIN, no limitation of GDATA is performed. The flow for the GDATA calculation is now terminated.

Figure 6:
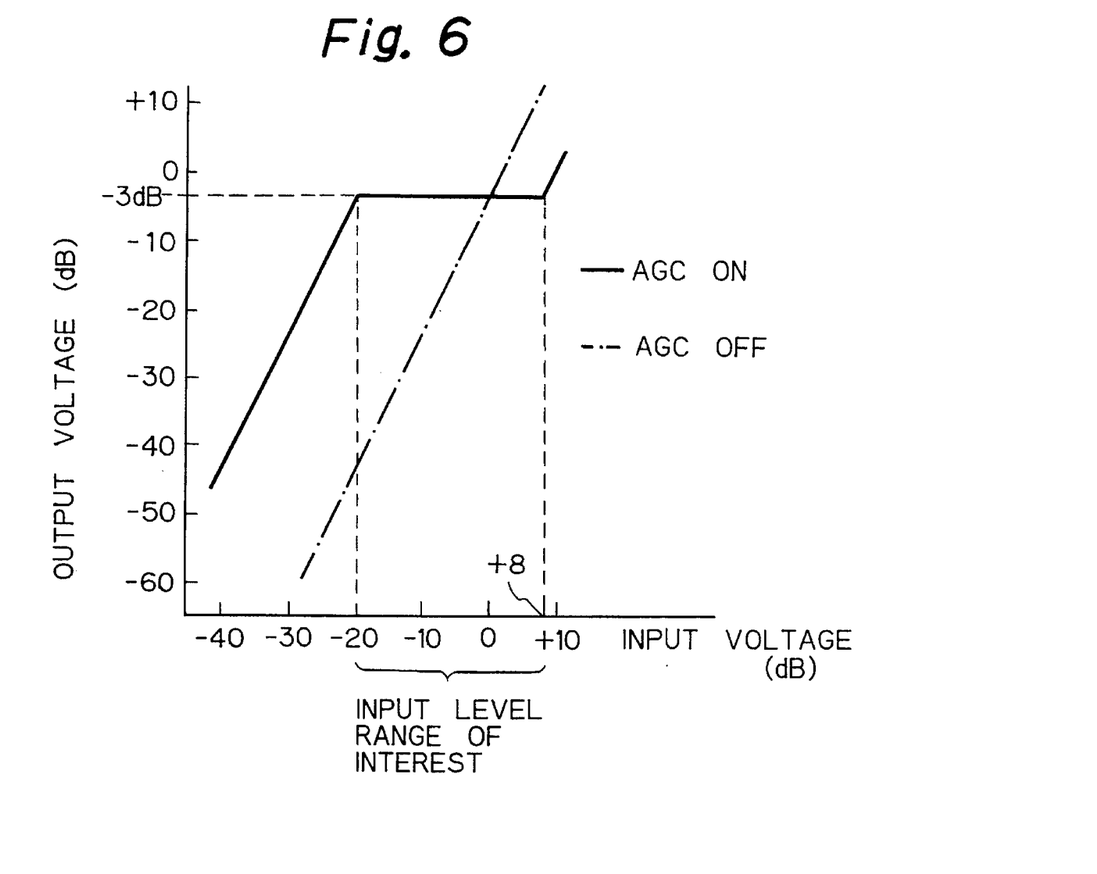

FIG. 6 shows the relationship between the input voltage (i.e. the input voltage of the DSP 20) and the output voltage (i.e. the output voltage of the D/A and LPF circuit 22) of the audio monitor B when the AGC function is performed by the use of the gain GDATA calculated as described above. It should be noted that the illustrated input/output relationship is derived when a sinusoidal wave signal is applied to the monitor for more than one second. In the graph, a dashed line shows the input/output relationship derived when the AGC function is not performed (OFF), and a solid line shows an input/output characteristic when the AGC function is performed (ON). As can be seen from the graph, when the AGC is on, an output at −3 dB is generated in response to inputs within the input level range from −20 dB to +8 dB, while an output voltage in accordance with the characteristics linearly changing from −3 dB is generated when an input is out of the input level range.

Referring to FIGS. 7, 8A–8C, the full wave rectification step 2100 in FIG. 4 will be explained in detail. First, the X-axis will be explained. At first step 21000 in FIG. 7, a current X-axis output value XOUTC (see FIG. 8A) is fetched or acquired, and a previous value XOUTP is fetched at next step 21002. The previous value XOUTP is equal to a previous X-axis full wave rectification value, as will be later described. Next, at step 21004, an absolute value (ABS) of the current X-axis output value XOUTC is derived and designated XOUTAB (see FIG. 8B).

Figure 7:
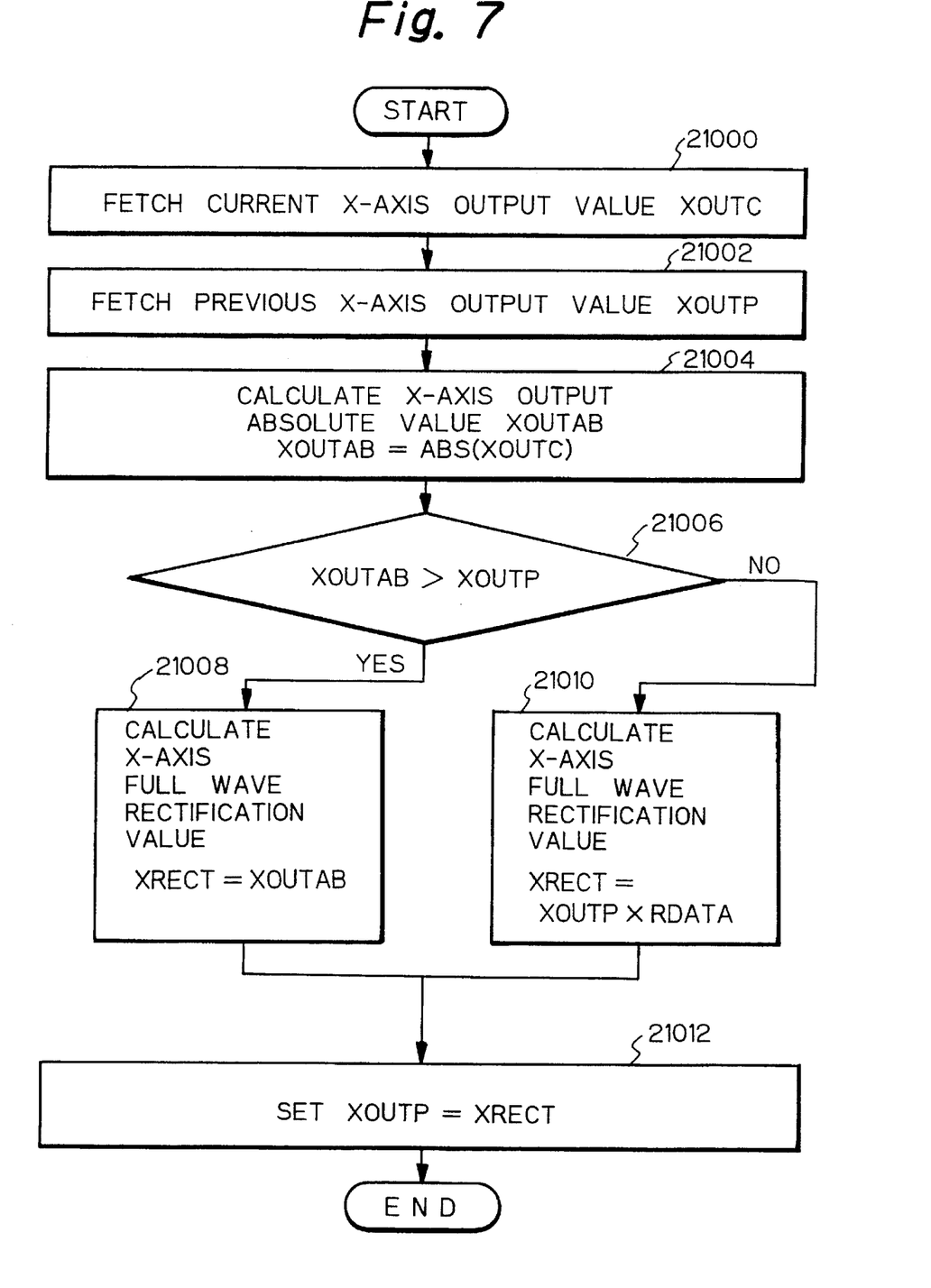
FIG. 7 is a flow chart showing in detail full wave rectification processing at step 2100 in FIG. 4.

Then, averaging processing is executed at a sequence of steps 21006–21012. First, at step 21006, it is determined whether or not XOUTAB is larger than XOUTP. If XOUTP is smaller than XOUTAB, for example, when the two values are in a relationship as indicated by XOUTAB' and XOUTP' in FIG. 8C, the X-axis full wave rectification value XRECT is made equal to the current X-axis output absolute value as indicated by the following equation (6):

$$XRECT=XOUTAB \quad (6)$$

Figure 8A:
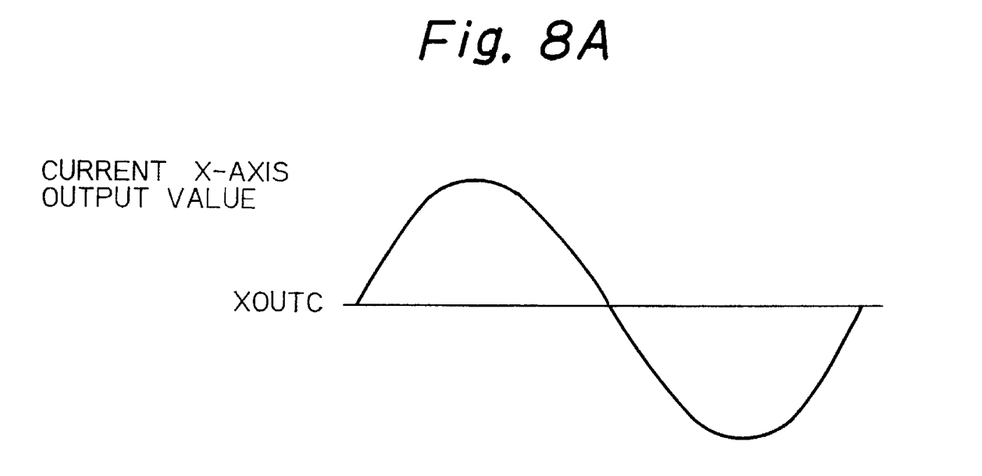
FIGS. 8A–8C are waveform charts schematically showing waveforms of signals associated with the full wave rectification processing of FIG. 7.
Figure 8B:
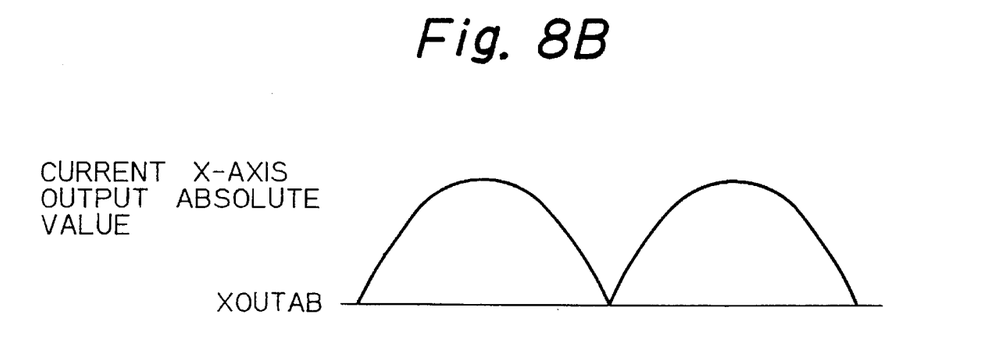
Figure 8C:
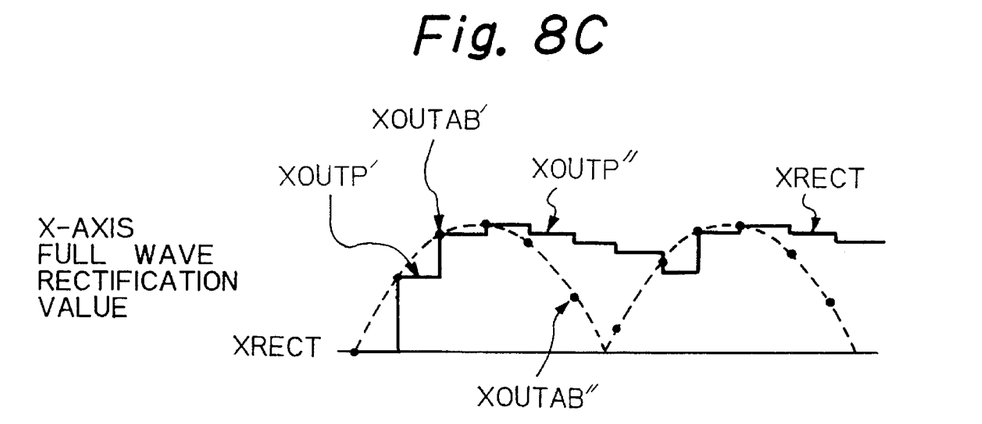

On the other hand, if the determination result is negative (NO) at step 21006, for example, when the two values are in a relationship as indicated by XOUTAB" and XOUTP" in FIG. 8C, XRECT is calculated by the following equation (7) at step 21010:

$$XRECT=XOUTP \times RDATA \quad (7)$$

Since the rectification ratio RDATA has been set to 0.9999, XRECT derived by the calculation is a value slightly smaller than XOUTP. After completing step 21008 or 2101, the calculated full wave rectification value XRECT is set to the previous value XOUTP, followed by the termination of the flow.

The calculation of the Y-axis full wave rectification value is executed by a similar flow to that shown in FIG. 7 (in FIG. 7, respective values related to the X-axis may be replaced by respective values related to the Y-axis), and thus explanation thereon will be omitted.

It will be understood that the embodiment of the present invention described above may be modified in various ways.

First, 3-1 configuration four-channel audio signals or audio signals in the Dolby surround format are also acceptable to the monitor scope of the present invention as multi-channel audio inputs. For example, with a 3-1 configuration four-channel signal, the calculation at step 204 in FIG. 3 may be replaced by the following equations (8):

$$XDATA=0.7\times(L+R+C+S)\times(R-L) \quad YDATA=(L+R+C+S)\times\{(C-S)\times0.7\times(L+R)\} \tag{8}$$

Secondly, the gain (GDATA) calculation step 210 in FIG. 3 may be performed before the gain control step 206. In this case, respective current values and previous values of XDATA and YDATA may be used instead of respective current values and previous values of XOUT and YOUT. Thirdly, while a static deflection type CRT is employed in the display section in the foregoing embodiment, an electromagnetic type CRT, which performs raster scan, may also be employed.

According to the present invention as described above, since sound image waveforms of square characteristic for audio inputs within a selected input level range can be substantially continuously displayed within a screen of a limited size, the localization and spacial impression of the respective sound images can be readily monitored. Also, the AGC function is performed based on the vector length of a sound image waveform, so that even if the localization of the sound image changes, the sound image at the same level is displayed as a sound image waveform of substantially the same length, thus further facilitating the monitoring of the sound image.

What is claimed is:

1. A sound image display method for visually displaying a sound image formed by a multi-channel surround audio signal in a reproduced sound field on a two-dimensional plane, said two-dimensional plane having a first axis and a second axis orthogonal to each other, said method comprising the steps of:

(a) generating a first signal representing a first axis component and a second signal representing a second axis component from said multi-channel surround audio signal for displaying a sound image;

(b) scaling the first and second signals by generating third and fourth signals, said third signal being generated by multiplying said first signal by a variable gain, the fourth signal being generated by multiplying said second signal by said variable gain, said variable gain being determined from a length of a vector and a reference value of the vector length, said vector having said first and second signals or said third and fourth signals as said first and second axis components, respectively, said variable gain being decreased when said vector length is larger than said reference value and increased when said vector length is not larger than said reference value; and (c) displaying a two-dimensional representation having said third and fourth signals as said first and second axis components, respectively.

2. A method according to claim 1, wherein said step (b) employs a first ratio when said variable gain is decreased, and employs a difference between said reference value and said vector length and a second ratio when said variable gain is increased.

3. A method according to claim 2, wherein said step (b) varies said variable gain between a lower limit value and an upper limit value.

4. A sound image display apparatus for visually displaying a sound image formed by a multi-channel surround audio signal in a reproduced sound field, comprising:

display means including a screen having a first axis and a second axis orthogonal to each other, a first axis input and a second axis input;

sound image axis component generating means coupled to receive said multi-channel surround audio signal for generating a first signal representing a first axis component and a second signal representing a second axis component for displaying a sound image; and scaling means for generating a third signal by multiplying said first signal by a variable gain and for generating a fourth signal by multiplying said second signal by said variable gain, said third and fourth signals being applied to said first and second axis inputs of said display means, respectively, said scaling means including variable gain calculating means for determining said variable gain by a length of a vector and a reference value of the vector length, said vector having said first and second signals or said third and fourth signals as said first and second axis components, respectively, said variable gain calculating means being operative to decrease said variable gain when said vector length is larger than said reference value and increase said variable gain when said vector length is not larger than said reference value.

5. An apparatus according to claim 4, wherein said variable gain calculating means calculates said vector length by the use of said third and fourth signals.

6. An apparatus according to claim 4 or 5, wherein said variable gain calculating means includes:

vector length calculating means coupled to receive said third and fourth signals for calculating a length of a vector having said third and fourth signals as said first and second axis components, respectively;

comparator means coupled to receive said vector length and said reference value for generating a fifth signal when said vector length is larger than said reference value and generating a sixth signal when said vector length is not larger than said reference value; and variable gain adjusting means for decreasing said variable gain when said comparator means generates said fifth signal and increasing said variable gain when said comparator means generates said sixth signal.

7. An apparatus according to claim 6, wherein said variable gain adjusting means employs a first ratio when said variable gain is decreased, and employs a difference between said reference value and said vector length and a second ratio when said variable gain is increased.

8. An apparatus according to claim 7, wherein said variable gain calculating means includes limiting means for limiting said variable gain adjusted by said variable gain adjusting means to a predetermined lower limit value when said adjusted variable gain is lower than said lower limit value, and for limiting said adjusted variable gain to a predetermined upper limit value when said adjusted variable gain is larger than said upper limit value.

* * * * *